(12) United States Patent
Golz et al.

(10) Patent No.: US 8,493,166 B2
(45) Date of Patent: Jul. 23, 2013

(54) ELECTROMAGNETIC ACTUATING APPARATUS

(75) Inventors: Thomas Golz, Sipplingen (DE); Thomas Schiepp, Seitingen-Oberflacht (DE)

(73) Assignee: ETO Magnetic GmbH, Stockach (DE)

( * ) Notice: Subject to any disclaimer, the term of this patent is extended or adjusted under 35 U.S.C. 154(b) by 204 days.

(21) Appl. No.: 13/056,880

(22) PCT Filed: Aug. 3, 2009

(86) PCT No.: PCT/EP2009/005599
§ 371 (c)(1),
(2), (4) Date: Jan. 31, 2011

(87) PCT Pub. No.: WO2010/012498
PCT Pub. Date: Feb. 4, 2010

(65) Prior Publication Data
US 2011/0133576 A1  Jun. 9, 2011

(30) Foreign Application Priority Data
Aug. 1, 2008  (DE) .................... 20 2008 010 301 U

(51) Int. Cl.
*H01F 7/08* (2006.01)
*H01F 3/00* (2006.01)
(52) U.S. Cl.
USPC ............... 335/264; 335/229; 335/232

(58) Field of Classification Search
USPC .................. 335/229–234, 259, 264
See application file for complete search history.

(56) References Cited

U.S. PATENT DOCUMENTS

| 2,935,663 | A | * | 5/1960 | Pollak | 335/259 |
| 6,967,550 | B2 | | 11/2005 | Elendt et al. | |
| 6,975,191 | B2 | * | 12/2005 | Ward | 335/18 |
| 2004/0201441 | A1 | | 10/2004 | Elendt et al. | |
| 2010/0192885 | A1 | | 8/2010 | Golz et al. | |

FOREIGN PATENT DOCUMENTS

| DE | 10240774 | 4/2003 |
| WO | 2008155119 | 12/2008 |

\* cited by examiner

*Primary Examiner* — Ramon Barrera
(74) *Attorney, Agent, or Firm* — Bachman & LaPointe, P.C.

(57) ABSTRACT

An electromagnetic actuating apparatus having an electromagnetic actuating unit which can be operated in order to exert an actuating force for an elongated plunger unit, wherein the actuating unit is provided in a housing along its actuating direction. The actuator unit forms an engagement surface which is planar in places and can be moved axially in the actuating direction, at an engagement end facing the plunger unit, an end surface of the plunger unit on the engagement side interacts detachably with the engagement surface, and the plunger unit is seated by magnetic attraction with its end surface on the engagement side on the engagement surface of the actuator unit, wherein the plunger unit is preferably designed to be soft-magnetic and furthermore preferably composed of soft iron, in the area of the end surface.

10 Claims, 2 Drawing Sheets

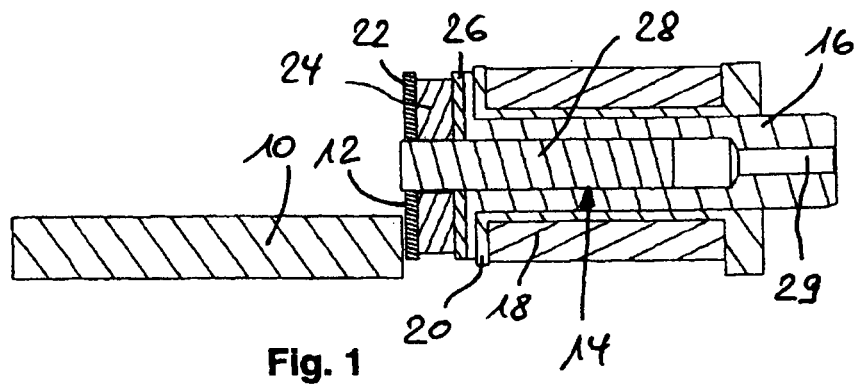
Fig. 1
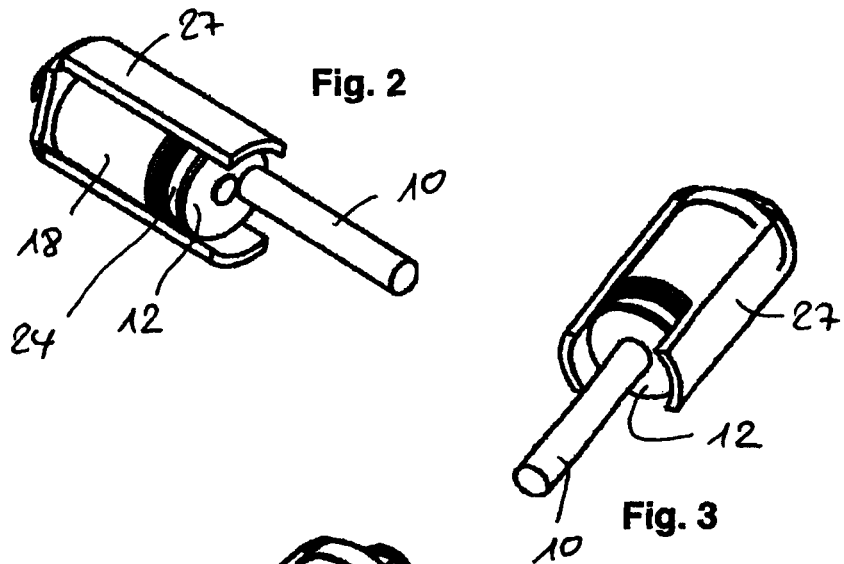
Fig. 2
Fig. 3
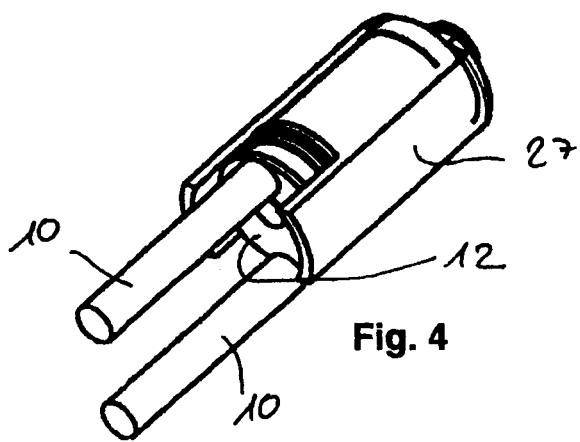
Fig. 4

ELECTROMAGNETIC ACTUATING APPARATUS

BACKGROUND OF THE INVENTION

The present invention relates to an electromagnetic actuating apparatus according to the preamble of the main claim. An apparatus of this kind is known from DE 102 40 774 by the same applicant and is used for various actuating tasks, for example in conjunction with internal combustion engines.

FIG. 5, relating to the prior art, shows the structural design of an electromagnetic actuating apparatus which is assumed to be known. A stationary core unit 32 is provided in a cylindrical housing 30, with a coil former 34 with a winding 36 provided thereon being located radially between said stationary core unit and cylindrical housing. An armature unit, which has an elongate tappet unit 42 which forms an engagement end 44 at its end, is guided such that it can move axially in relation to the core unit 32. The armature unit has, opposite the engagement end 44 and for the purpose of magnetically interacting with the core unit, a multiple-disk arrangement comprising a permanent-magnet disk 38 and also, adjacent to this on either side, a first and, respectively, a second armature disk 48, 50. The casing of this arrangement is enclosed by a surrounding ring 52.

In the position shown in FIG. 5, the armature unit is attached to the core 32 by the action of the permanent magnet 38. Applying current to the winding 36 then generates a repelling field, as a result of which the armature unit (on the right in the plane of the figure) is moved axially and, accordingly, an actuating partner can be driven such that the end acts on the engagement end 44.

A schematically described apparatus of this kind is known in various embodiments and is used for various applications, for example including for camshaft adjustment in an internal combustion engine. In this case, the ease of manufacture makes it highly suitable for large-scale production, and therefore the technology known from the prior art can already be produced at favorable unit costs.

However, at the same time, the technology illustrated in accordance with FIG. 5 has also proven inflexible, in particular in respect of special installation space requirements. For example, it is, as shown in FIG. 5, a specific structural principle of the known technology for the tappet unit 42 to be part of the armature unit and therefore to be arranged rigidly on the disk pack 48, 38, 50; these units cannot be separated and, for efficient installation, therefore require a radially symmetrical installation contour which corresponds as far as possible. FIG. 6, as a schematic installation contour in an internal combustion engine (specifically: the installation space for an electromagnetic actuator for camshaft adjustment), shows, in contrast, by way of example, the real space conditions at the site of use; the assembly (shown only symbolically in FIG. 7) shows that a traditional radially symmetrical arrangement in accordance with FIG. 5 (inasmuch as the unit 60 shows an actuator, which can be mounted, in accordance with the principle of FIG. 5) cannot be installed with the installation conditions of FIG. 6. Rather, it would be necessary, while maintaining the radially symmetrical design principle, to significantly reduce the diameter of the actuator, this either already being excluded for structural reasons or else requiring much higher magnetic power densities. This, in turn, necessitates particularly valuable (and therefore expensive) materials, for example for the permanent-magnet unit 38, and therefore such miniaturization is not only potentially uneconomical but also results in additional special outlay on logistics for special components.

The object of the present invention is therefore to improve an electromagnetic actuating apparatus of this generic type in respect of simple production and flexibility in use, in particular to improve its suitability for asymmetrical installation conditions (where "asymmetrical" in the scope of the present invention is to be understood as meaning those installation conditions which are not radially symmetrical in relation to a movement direction of the tappet unit).

SUMMARY OF THE INVENTION

The object is achieved by the electromagnetic actuating apparatus having an electromagnetic actuator unit which can be driven to exert an actuating force on an elongate tappet unit, with the actuator unit being provided in a housing along its actuating direction, characterized in that the actuator unit, at an engagement end which faces the tappet unit, forms an engagement face which is planar at least in sections and can be moved axially in the actuating direction, an engagement-side end face of the tappet unit interacts with the engagement face in a detachable manner, and the tappet unit, by way of its engagement-side end face, sits on the engagement face of the actuator unit in a magnetically attached manner, with preferably the tappet unit being formed to be magnetically soft, further preferably from soft iron, in the region of the end face. The electromagnetic actuator is particularly useful in an internal combustion engine.

The present invention overcomes the mechanically rigid, non-detachable and radially symmetrical connection between the tappet unit (more precisely: tappet section) and armature unit in an advantageous manner according to the invention. According to the invention, this is replaced by an actuator unit on which the tappet unit sits as a separate component in a magnetically attached and detachable manner. This provides the option of, as provided according to preferred exemplary embodiments, this tappet unit also sitting eccentrically (or possibly even only by way of its end face in a partially overlapping manner) on the engagement face of the actuator unit, in other words being able to form an asymmetrical, and therefore non-radially symmetrical, arrangement even with the actuator unit and thus adapt to suitable installation spaces.

In this case, the actuator unit itself is typically in turn formed by means of an armature unit which has, in a manner which is otherwise known, permanent-magnet means which interact with a stationary core unit and can be moved in response to current being applied to a stationary coil unit.

In order to optimize flux conduction and/or to adapt to a suitable installation space in a particularly favorable manner in terms of structural shape, it has also proven advantageous to surround the coil unit with a magnetic-flux conducting actuator casing unit, of which at least sections are cylindrical or hollow-cylindrical, as a housing, one end of said housing being open in the axial direction in order to expose the engagement face.

The casing of this actuator casing unit can now not be completely closed, but rather be configured merely in the form of a bracket (that is to say U-shaped in longitudinal section) or even in an L shape with only one free limb.

According to one development, it is also advantageous within the scope of the invention to configure the permanent-magnet means, which are to be designed in the form of a disk, to be radially widened in relation to an elongate armature tappet section of the armature, which armature tappet section is guided within the core unit, in order to improve the magnetic properties in this respect. According to preferred developments of the invention, the core unit can also be suitably adapted to a respective intended use and can be dynamically improved, for example, by means of a passage which allows for fluid pressure compensation.

In a manner which is advantageous for magnetic flux, the tappet unit is configured to be magnetically soft (in particular by being produced from soft iron in this region) on the engagement side, that is to say in the region of its engagement-side end face and in order to interact with the engagement face, such that it is magnetically attached to the actuator unit or the engagement face thereof without problems.

The present invention therefore allows for highly flexible adaptation even to asymmetrical installation conditions. The electromagnetic actuating apparatus of the present invention is accordingly suitable, in a particularly advantageous manner, for a very wide variety of uses in asymmetrical installation spaces as often occur in internal combustion engines for carrying out a very wide variety of actuating functions, for example camshaft adjustment.

According to a further preferred embodiment of the invention, it is additionally possible not just to provide only one tappet unit on the engagement face of the actuator unit such that said tappet can be driven by said actuator unit, but rather it is also possible, according to the invention, to position a plurality of tappets on a common engagement face. To date, this has been highly problematical in technologies known from the prior art since the positioning of two tappets in two holes for large-scale production required, with stationary tappets, very exact tolerances which could be realized only rarely, particularly in a thermally sensitive motor vehicle environment. However, the present invention permits tolerance compensation by virtue of mechanical attachment, and therefore specifically a solution in which two (or more) tappets can be driven by a common stroke of one actuator unit, is considerably simplified.

BRIEF DESCRIPTION OF THE DRAWINGS

Further advantages, features and details of the invention can be gathered from the following description of preferred exemplary embodiments and also with reference to the drawings, in which FIG. 1: shows a schematic longitudinal section through the electromagnetic actuating apparatus according to a first preferred embodiment of the present invention;

FIG. 2: shows a perspective view for illustrating an asymmetrical arrangement of a tappet unit on the engagement face of an actuator unit with a bracket-like actuator casing unit according to a second embodiment of the invention;

FIG. 3: shows an illustration which is analogous to FIG. 2 and with a tappet unit which is mounted in a radially symmetrically detachable manner in this case;

FIG. 4: shows a view which is analogous to FIG. 2 and FIG. 3 with a pair of tappet units which are mounted jointly on an engagement face.

DETAILED DESCRIPTION

Figure 6:
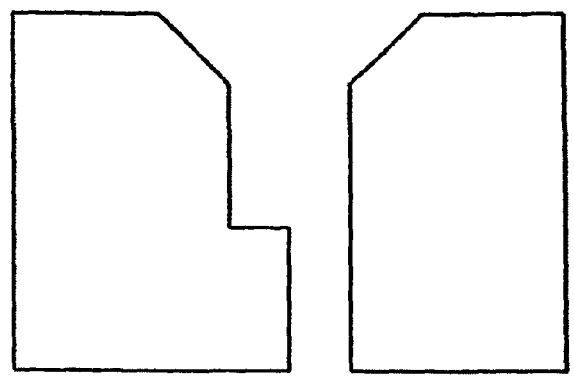
FIGS. 5 through 7 relate to the prior art.
Figure 7:
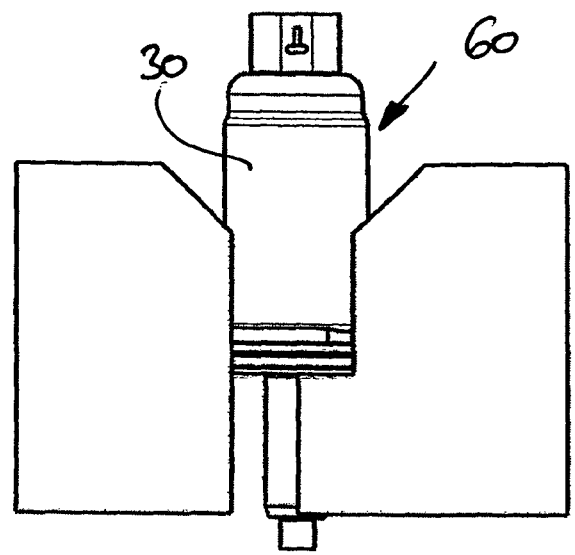
Figure 5:
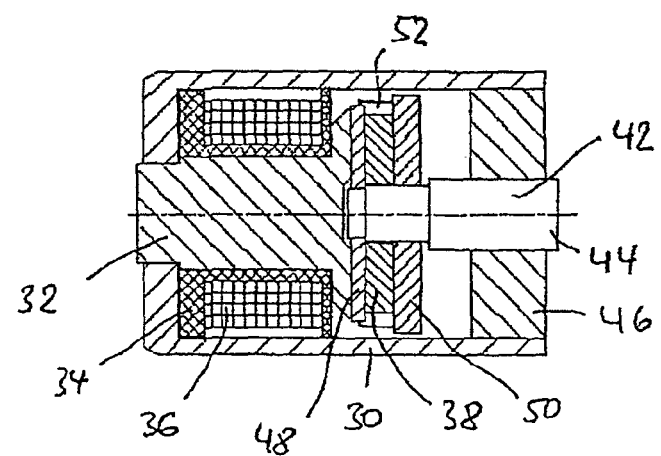

FIG. 1 shows a schematic longitudinal sectional view of how a tappet unit 10 with a soft-iron section sits on an engagement face 12 of an armature unit 14 in a magnetically attached and detachable manner, said armature unit in turn being guided in an axially moveable manner in a stationary core unit 16 and in a moveable manner relative to said stationary core unit in response to current being applied to a coil 18 (which is, in turn, held on a coil former 20). The armature unit 14 has, on the engagement side, a disk-like arrangement comprising a front armature disk 22, a permanent-magnet unit 24 and a core-side armature disk 26 and is continued by an armature tappet section 28 which can move in a hollow-cylindrical interior of the core unit 16 in the shown way. The disk arrangement 22, 24, 26 is connected to the tappet 28 in a fixed and non-detachable manner, for example, by the disks 22, 26 which are composed of magnetically permeable steel being welded to the end of the tappet 28. At the rear end, the core unit 16 is open by means of a hole 29.

The tappet unit 10 is attached, by way of its magnetic action, over the full surface or part of the surface relative to the engagement face 12, concentrically to the longitudinal axis (FIG. 3) or eccentrically (FIG. 2), and it is therefore possible to adapt as desired to respective installation conditions and installation spaces. It is obvious that a configuration of the type shown in FIG. 1 can be included in the requirements for FIG. 6 in an unproblematical manner and so as to maximize the available installation space for the electromagnetic unit shown without problems.

This structural embodiment within the scope of the invention, as shown in FIG. 4, also allows for two (or more) tappet units 10 to be mounted on the same engagement face 12 and thus, for example, as shown in FIG. 4, to be jointly driven in the parallel direction in relation to one another. In this case, the tolerance problem known from the prior art of two tappets which are to be guided in two holes is particularly effectively solved since the magnetic attachment between the respective tappet units and the armature unit ensures simple tolerance compensation.

The tappet unit 10 according to preferred developments of the invention is magnetically produced such that it has a magnetically soft section, which is preferably produced from soft iron, on the engagement face 12 in the direction of the armature unit and for interacting in an attached manner with the permanent-magnet unit 24. In the direction of an actuating partner (not shown) of the tappet unit which is situated opposite, said tappet unit is, in contrast, of hard and wear-resistant design in order to achieve long service times during long-term operation, for example for camshaft adjustment, in this respect. The two sections can be configured by suitable material influencing operations (for example by hardening a soft-iron tappet body to form the wear-resistant section), or alternatively by non-detachably joining two different (for example metal) materials by welding or a similar process.

The invention claimed is:

1. An electromagnetic actuating apparatus comprising an electromagnetic actuator unit which is driven to exert an actuating force on an elongate tappet unit, wherein the actuator unit is provided in a housing along an actuating direction, the actuator unit, at an engagement end which faces the tappet unit, forms an engagement face which is planar at least in sections and is moved axially in the actuating direction, an engagement-side end face of the tappet unit interacts with the engagement face in a detachable manner, and the tappet unit, by way of its engagement-side end face, sits on the engagement face of the actuator unit in a magnetically attached manner, the tappet unit is formed to be magnetically soft from soft iron in the region of the end face, the actuator unit has an armature unit which has permanent-magnet means and forms the engagement face at its end and can be moved by current being applied to a stationary coil unit, and the coil unit is surrounded by a magnetic-flux conducting actuator casing unit, of which at least sections are cylindrical or hollow-cylindrical, such that the engagement face is movable in an open end of the actuator casing unit.

2. The apparatus as claimed in claim 1, wherein the tappet unit sits eccentrically and/or by way of only a partial area on the engagement face.

3. The apparatus as claimed in claim 1, wherein the actuator casing unit is of L-shaped or bracket-like design such that a free limb of the actuator casing unit forms a circumferential boundary of the armature unit and also of the coil unit, this circumferential boundary being in the form of a hollow-cylindrical section.

4. The apparatus as claimed in claim 1, wherein the armature unit has a widened armature section, which has the permanent-magnet means, axially outside the coil unit and also an elongate armature tappet section which sits on said armature section and is guided, at least in sections, in an elongate core unit of the actuator unit, which core unit is enclosed by the coil unit.

5. The apparatus as claimed in claim 4, wherein the core unit is produced from magnetic material and has a passage hole which allows for fluid pressure compensation.

6. The apparatus as claimed in claim 1, wherein the tappet unit has two sections along its longitudinal axis, a first section of said sections being magnetically soft in order to interact in a magnetically attached manner with permanent-magnet means of the actuator unit, and a second section of said sections, which second section is designed to interact with an actuating partner, being of hardened and/or wear-resistant design.

7. The apparatus as claimed in claim 1, wherein a plurality of tappet units interacts with a common engagement face in a detachable manner.

8. The apparatus as claimed in claim 7, wherein at least two of the tappet units are guided so as to run parallel to one another.

9. The apparatus as claimed in claim 1, in combination with an asymmetric installation space in an internal combustion engine.

10. The apparatus as claimed in claim 1, comprising a camshaft adjustment apparatus for the internal combustion engine.

\* \* \* \* \*